United States Patent
Inoue et al.

(10) Patent No.: US 6,377,454 B1
(45) Date of Patent: Apr. 23, 2002

(54) HEAT CONDUCTING APPARATUS AND ELECTRONIC APPARATUS HAVING THE SAME

(75) Inventors: Koichi Inoue, Kawasaki; Chiyoshi Sasaki, Tokyo, both of (JP)

(73) Assignees: Fujitsu Limited, Kawasaki; Furukawa Electric Co., Ltd., Tokyo, both of (JP)

(*) Notice: Subject to any disclaimer, the term of this patent is extended or adjusted under 35 U.S.C. 154(b) by 0 days.

(21) Appl. No.: 09/558,159

(22) Filed: Apr. 26, 2000

(30) Foreign Application Priority Data

Apr. 28, 1999 (JP) .......................................... 11-122372

(51) Int. Cl.⁷ ................................................. G06F 1/20
(52) U.S. Cl. ........................ 361/687; 361/707; 361/704; 165/80.4; 62/259.2
(58) Field of Search .................................. 361/687, 699, 361/680, 681, 700, 704, 707; 364/708.1; 165/80.4, 104.33, 104.21; 62/259.2; 174/15.2

(56) References Cited

U.S. PATENT DOCUMENTS

| | | | |
|---|---|---|---|
| 4,571,456 A | 2/1986 | Paulsen et al. | 179/2 C |
| 5,383,340 A | 1/1995 | Larson et al. | 62/259.2 |
| 5,513,070 A | 4/1996 | Xie et al. | 361/700 |
| 5,568,360 A | 10/1996 | Penniman et al. | 361/687 |
| 5,588,483 A | 12/1996 | Ishida | 165/86 |
| 5,634,351 A | 6/1997 | Larson et al. | 62/259.2 |
| 5,642,776 A | 7/1997 | Meyer, IV et al. | 165/104.26 |
| 5,646,822 A | 7/1997 | Bhatia et al. | 361/687 |
| 5,718,282 A * | 2/1998 | Bhatia et al. | 165/86 |
| 5,757,615 A | 5/1998 | Donahoe et al. | 361/687 |
| 5,781,409 A | 7/1998 | Mercedy, III | 361/687 |
| 5,796,581 A | 8/1998 | Mok | 361/687 |
| 5,822,187 A | 10/1998 | Garner et al. | 361/687 |
| 5,828,552 A | 10/1998 | Ma | 361/704 |
| 5,832,987 A * | 11/1998 | Lowry et al. | 165/86 |
| 5,847,925 A | 12/1998 | Progl et al. | 361/687 |
| 6,097,597 A | 8/2000 | Kobayashi | 361/687 |
| 6,226,179 B1 * | 5/2001 | Lee | 361/687 |
| 6,250,378 B1 | 6/2001 | Kobayashi | 165/104.33 |

FOREIGN PATENT DOCUMENTS

| | | |
|---|---|---|
| EP | 0 702 287 A2 | 3/1996 |
| JP | 8-204373 | 8/1996 |
| JP | 8-261672 | 10/1996 |
| JP | 9-6481 | 1/1997 |
| JP | 9-16289 | 1/1997 |
| JP | 9-79772 | 3/1997 |
| JP | 9-133483 | 5/1997 |
| JP | 9-293985 | 11/1997 |
| JP | 10-39955 | 2/1998 |
| JP | 11-243289 | 9/1999 |
| JP | 11-330757 | 11/1999 |
| JP | 11-338581 | 12/1999 |
| JP | 11-338582 | 12/1999 |
| JP | 2000-22376 | 1/2000 |
| JP | 2000-55576 | 2/2000 |
| JP | 2000-132280 | 5/2000 |
| JP | 2000-222070 | 8/2000 |
| JP | 2000-259287 | 9/2000 |
| JP | 2000-293271 | 10/2000 |
| JP | 2000-20171 | 1/2001 |

* cited by examiner

*Primary Examiner*—Leo P. Picard
*Assistant Examiner*—Hung Van Duong
(74) *Attorney, Agent, or Firm*—Armstrong, Westerman & Hattori, LLP

(57) ABSTRACT

A heat conducting apparatus includes a heat pipe and a heat pipe supporting mechanism. The heat pipe conducts heat between a first member and a second member connected by hinge sections. The heat pipe has a first end portion attached to one of the first and second members and a second end portion extending substantially along a center line of the hinge sections. A heat pipe supporting mechanism is disposed on a member different from the one of the first and the second members of the heat pipe. The heat pipe supporting mechanism supports the second end portion so that the second end portion can freely move within a given range. The heat pipe supporting mechanism forms a thermal path between the first and second members together with the heat pipe.

15 Claims, 13 Drawing Sheets

HEAT CONDUCTING APPARATUS AND ELECTRONIC APPARATUS HAVING THE SAME

BACKGROUND OF THE INVENTION

1. Field of the Invention

The present invention relates to a heat conducting apparatus and an electronic apparatus having such a heat conducting apparatus.

Notebook computers are required to have multi-function, high performance, high density and high speed. For the above requirement, it is essential to enhance the performance of a central processing unit (CPU) or the like incorporated therein. However, the enhancement of the performance of a CPU entails an increased generation of heat therefrom, thus requiring more efficiency than ever in the even diffusion and the radiation of heat. It is preferable to employ a heat pipe for achieving such efficiency.

A notebook computer includes a main unit containing a CPU, a keyboard and so on and a separate liquid crystal display section which rotates on a hinge section and can be opened up from or closed down to the main unit. The liquid crystal display section is opened at the beginning and closed in the end of the use of the notebook computer. This folding action of the liquid crystal display section is repeated while the notebook computer is in use. Therefore, when the notebook computer is used over a long period of time, the frequent folding action of the liquid crystal display section causes the hinge section to be worn down and have a play therein, with the result that the center of the hinge section sometimes moves, though slightly, during the folding action of the liquid crystal display section. The incorporation of a heat pipe into a notebook computer requires careful consideration of the above described structure of a notebook computer.

2. Description of the Related Art

Japanese Laid-Open Patent Application Nos. 9-6481 and 9-16289 disclose conventional notebook computers wherein a heat pipe is incorporated to transmit heat generated from a CPU within a main unit to a liquid crystal display section for the purpose of the even diffusion and the radiation of heat.

In the aforementioned notebook computers, the heat pipe runs through the center of the hinge section connecting the main unit and the liquid crystal display section. The heat generated from the CPU within the main unit is transmitted through a metal plate to the heat pipe inserted into the hinge section. The heat is further conducted through the heat pipe to a heat radiating plate within the liquid crystal display section to be radiated to the outer air.

Japanese Laid-Open Patent Application No. 9-293985 discloses a notebook computer including: a main unit provided with hinge sections on its rear portion; a liquid crystal display section hinged to the main unit; cooling fins attached to a heat radiating portion of a heat pipe; and the heat pipe having its one end portion disposed in the liquid crystal display section.

In the notebook computers disclosed in Japanese Laid-Open Patent Application Nos. 9-6481 and 9-16289, force caused by the folding action of the liquid crystal display section and the load of the liquid crystal display are directly exerted on the heat pipe. Therefore, there is a danger that the heat pipe may be broken in the worst case as a result of the forced bend of its portion.

Further, the connection of the main unit and the liquid crystal display section becomes complicated because the heat pipe runs through the hinge section.

In the notebook computer disclosed in Japanese Laid-Open Patent Application No. 9-293985, the heat is not transmitted efficiently from the heat radiating portion of the heat pipe to the liquid crystal display section. Therefore, the efficiency in the even diffusion and the radiation of heat is not achieved.

SUMMARY OF THE INVENTION

A general object of the present invention is to provide a heat conducting apparatus and an electronic apparatus having such a heat conducting apparatus in which the above described problems are eliminated.

A more specific object of the present invention is to provide a heat conducting apparatus achieving more efficiency in the even diffusion and the radiation of heat without damaging or breaking a heat pipe employed therein, and an electronic apparatus having such a heat conducting apparatus.

The above objects of the present invention are achieved by a heat conducting apparatus including: a heat pipe which conducts heat between a first member and a second member connected by hinge sections, the heat pipe having a first end portion attached to one of the first and second members, and a second end portion extending substantially along a center line of the hinge sections; and a heat pipe supporting mechanism which is disposed on a member different from the one of the first and second members of said heat pipe and supports the second end portion so that the second end portion can freely move within a given range, the heat pipe supporting mechanism forming a thermal path between the first and second members together with the heat pipe. Hence, the second end portion of the heat pipe is allowed to move in accordance with the movement of the center of the hinge sections when the first member is rotated to be opened or closed with respect to the second member, causing no bending stress to develop within the heat pipe. Therefore, it is possible to prevent the heat pipe from being damaged or broken.

The above objects of the present invention are also achieved by an electronic apparatus having a first housing and a second housing connected by hinge sections, the electronic apparatus comprising: a heat pipe which has a first end portion disposed on one of the first and second housings, and a second end portion extending along a center line of said hinge sections; and a heat pipe supporting mechanism which is disposed on a housing different from the one of the first and second housings of the heat pipe and supports the second end portion so that the second end portion can freely move within a given range, the heat pipe supporting mechanism forming a thermal path between the first and second housings together with the heat pipe. Hence, the second end portion of the heat pipe is allowed to move in accordance with the movement of the center of the hinge sections when the first housing is rotated to be opened or closed with respect to the second housing, causing no bending stress to develop within the heat pipe. Therefore, it is possible to prevent the heat pipe from being damaged or broken and to realize an electronic apparatus having more efficiency in the even diffusion and the radiation of heat.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 4:
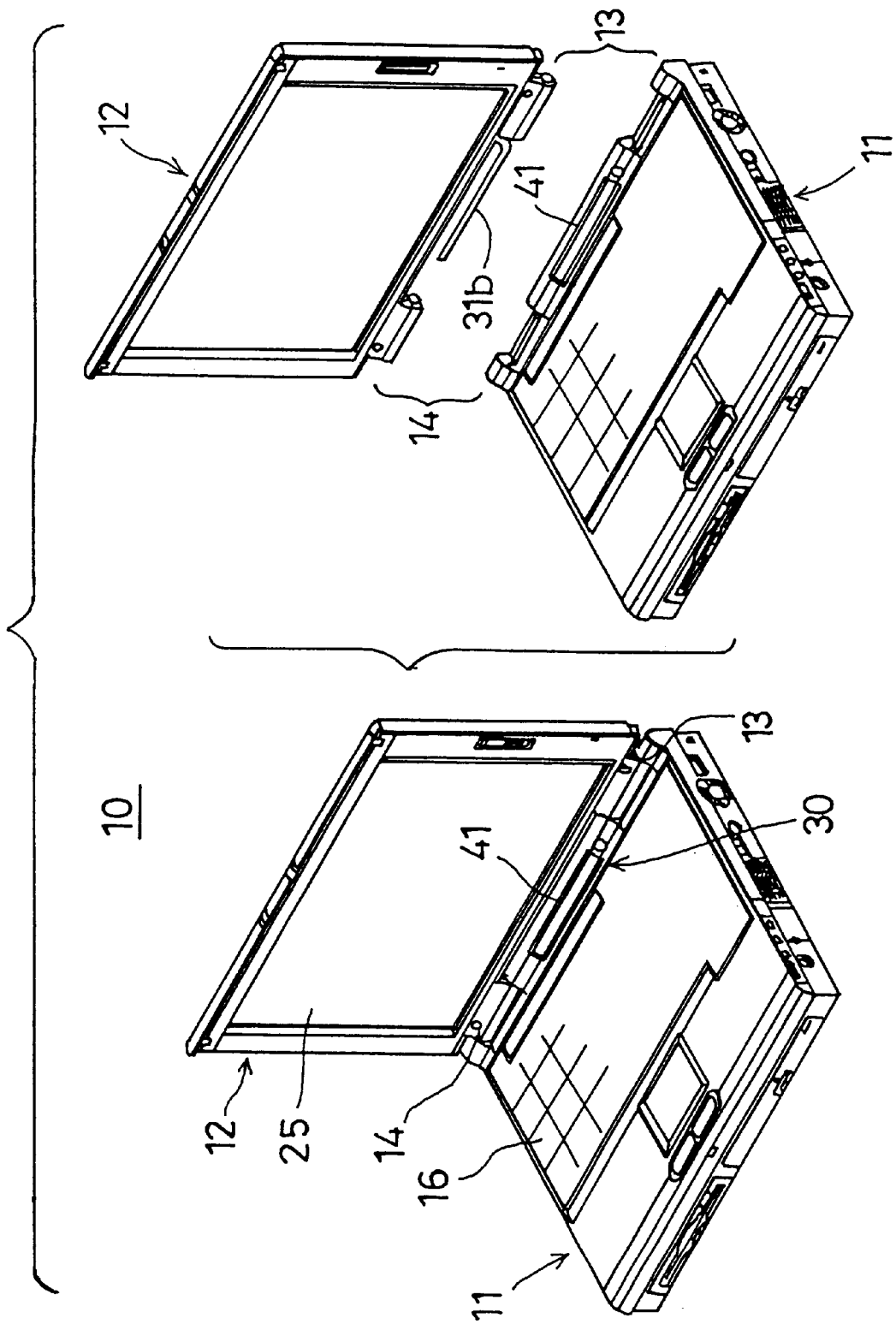
FIG. 4 is a perspective view of a notebook computer wherein the heat conducting apparatus of FIG. 1 is employed.
Figure 5:
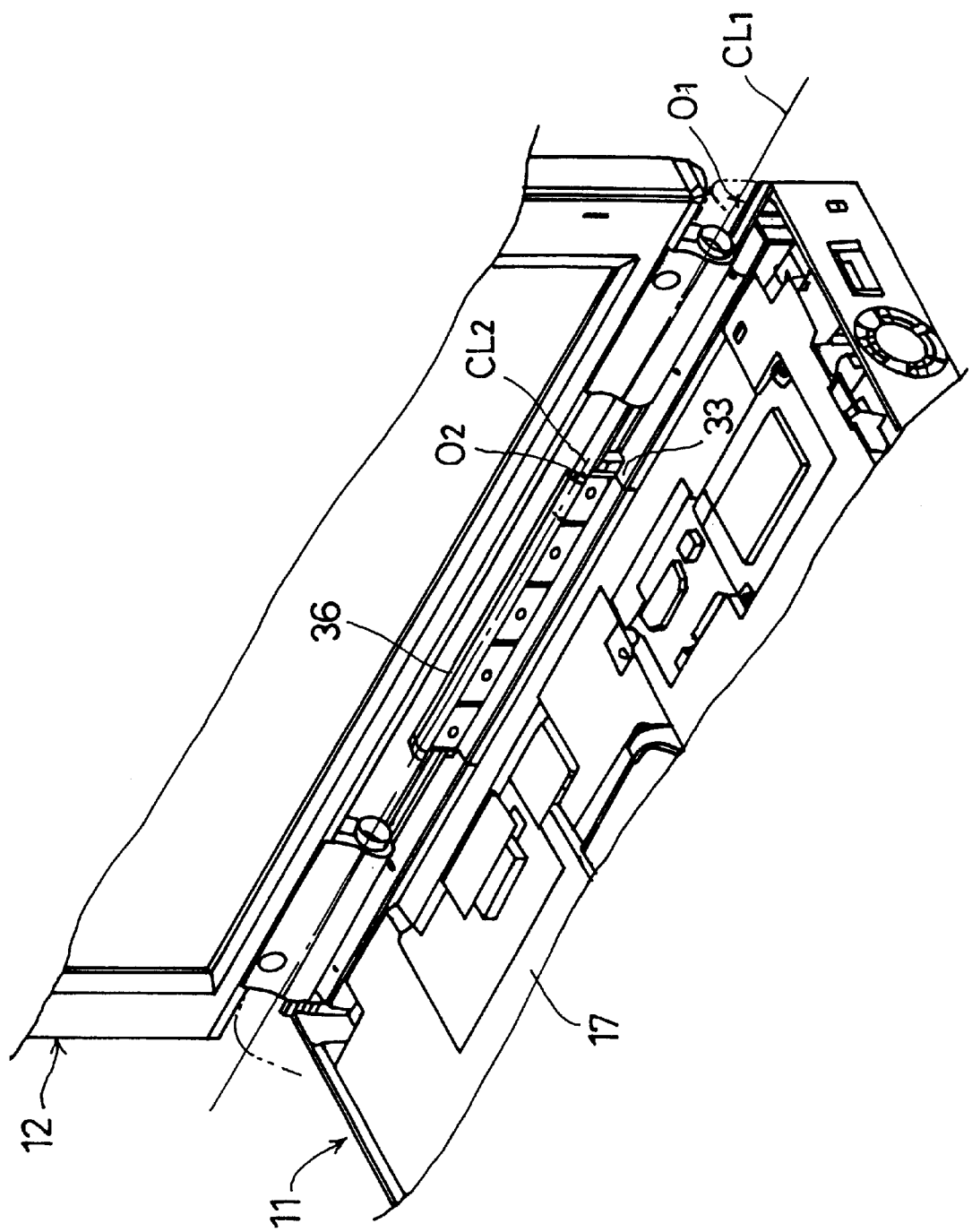
FIG. 5 is an enlarged view of the heat conducting apparatus and the hinge sections of the notebook computer of FIG. 4 without a keyboard section.

FIG. 4 depicts a notebook computer 10 as an electronic apparatus having a heat conducting apparatus 30 according to a first embodiment of the present invention. The notebook computer 10 includes a main unit 11 and a liquid crystal display section 12. The main unit 11 serves as a first housing of the notebook computer and the liquid crystal display section 12 serves as a second housing thereof. The liquid crystal display section 12 is connected rotatably to the main unit 11 by means of hinge sections 13 and 14 arranged on each rear corner of the main unit 11 so as to freely be opened and closed with respect to the main unit 11. In FIG. 5, CL1 indicates the center line of the hinge sections and O1 indicates the center of the hinge sections 13 and 14.

Figure 1:
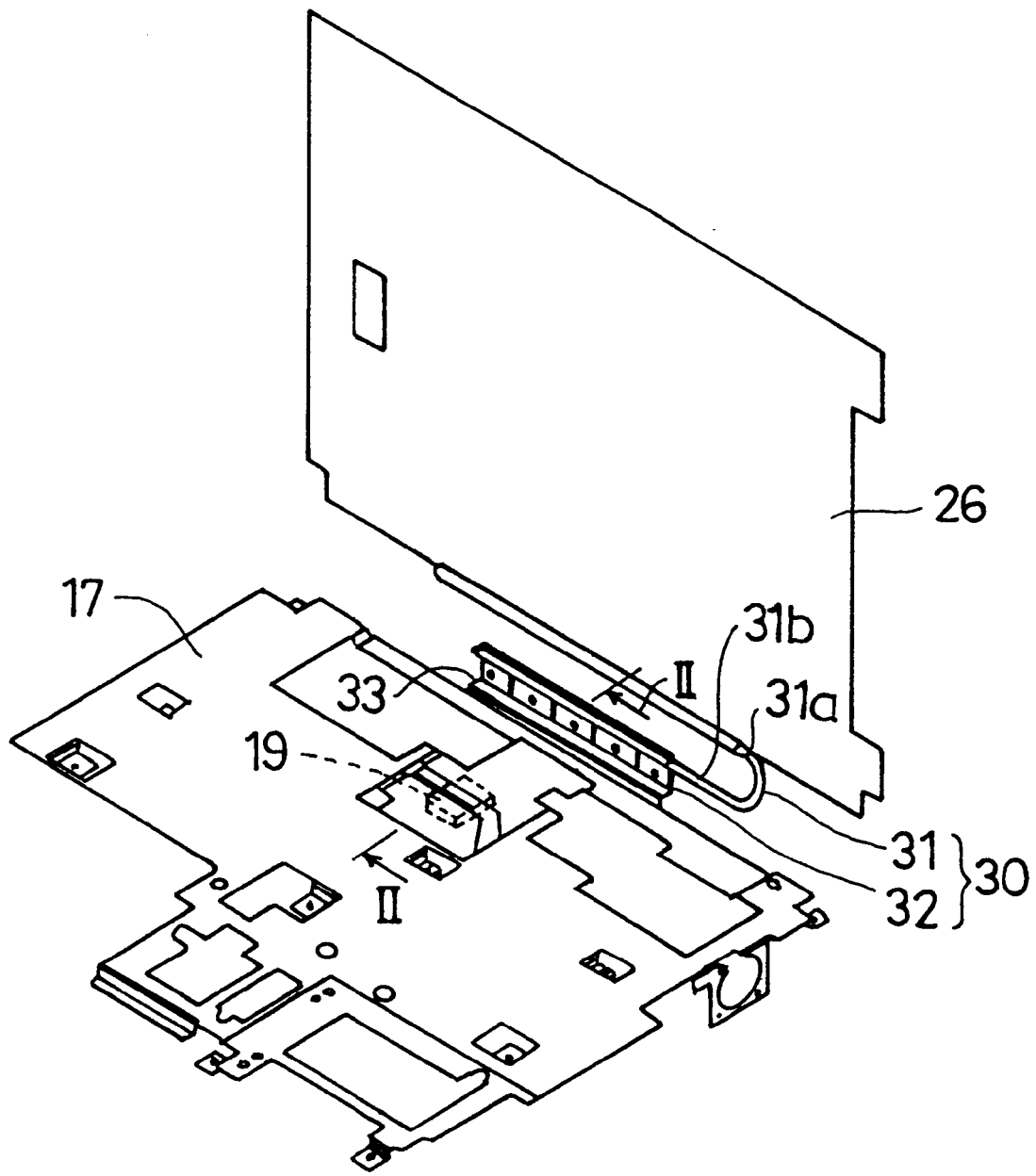
FIG. 1 is an exploded view of a heat conducting apparatus according to a first embodiment of the present invention.
Figure 2:
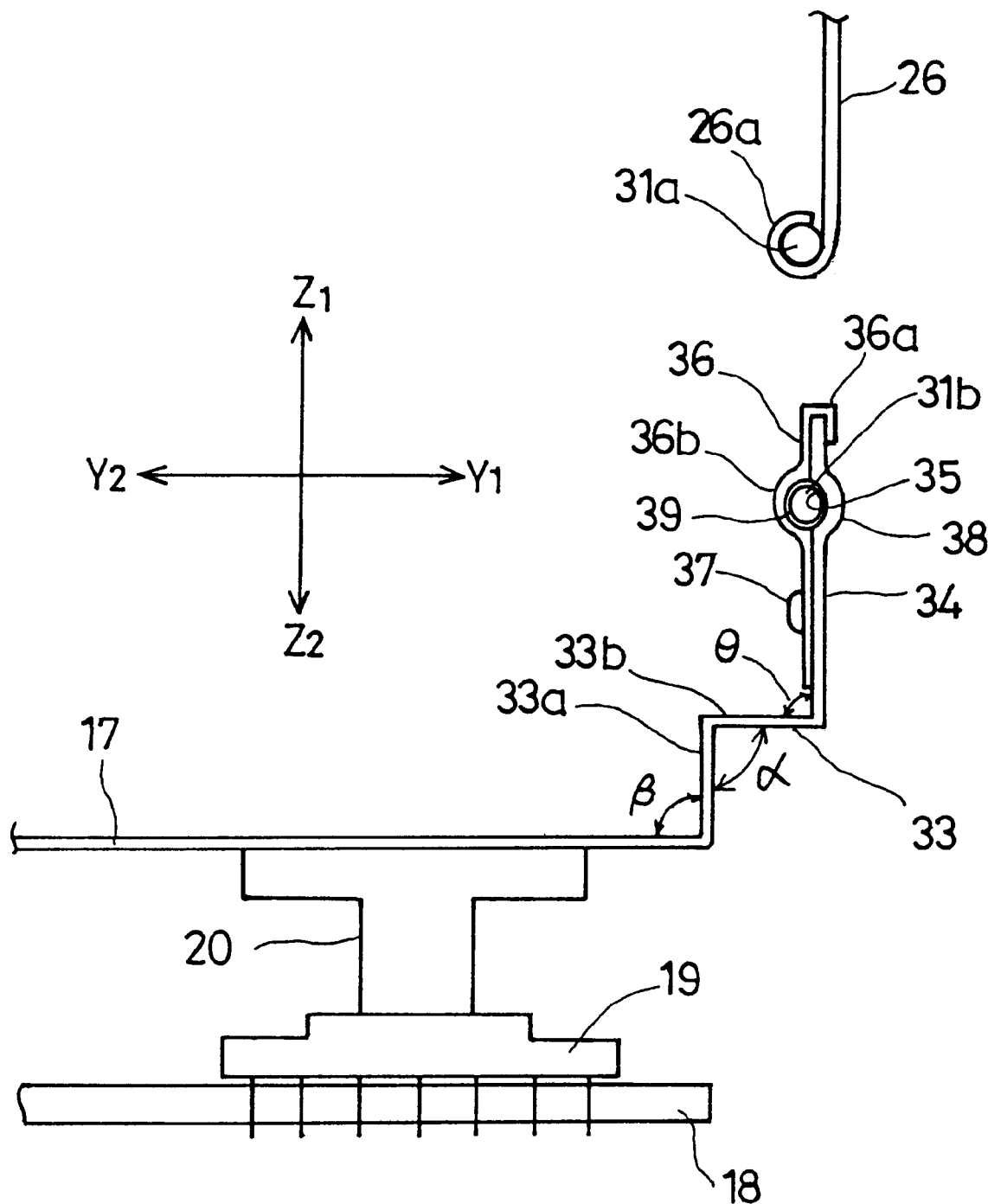
FIG. 2 is an enlarged cross section along the II—II line of the heat conducting apparatus of FIG. 1.

The main unit 11 is equipped on its upper surface with a keyboard 16 as shown in FIG. 4 and incorporates therein, as shown in FIGS. 1 and 2, a base plate 17, a printed circuit board 18, a CPU 19 as a heating body and so on. The base plate 17 is a thin aluminum plate as thick as about 1 mm. The upper surface of a block 20 is thermally bonded to the bottom surface of the base plate 17 and the bottom surface of the block 20 is held in thermal contact with the top of the CPU 19. The liquid crystal display section 12 is provided on its front face with a liquid crystal display 25, which has a heat radiating plate 26 on its rear side as shown in FIGS. 1 and 2.

Herein will be described a heat conducting apparatus 30.

The heat conducting apparatus 30 includes a heat pipe 31 and a heat pipe supporting mechanism 32 as shown in FIGS. 1, 2 and 5.

Figure 3:
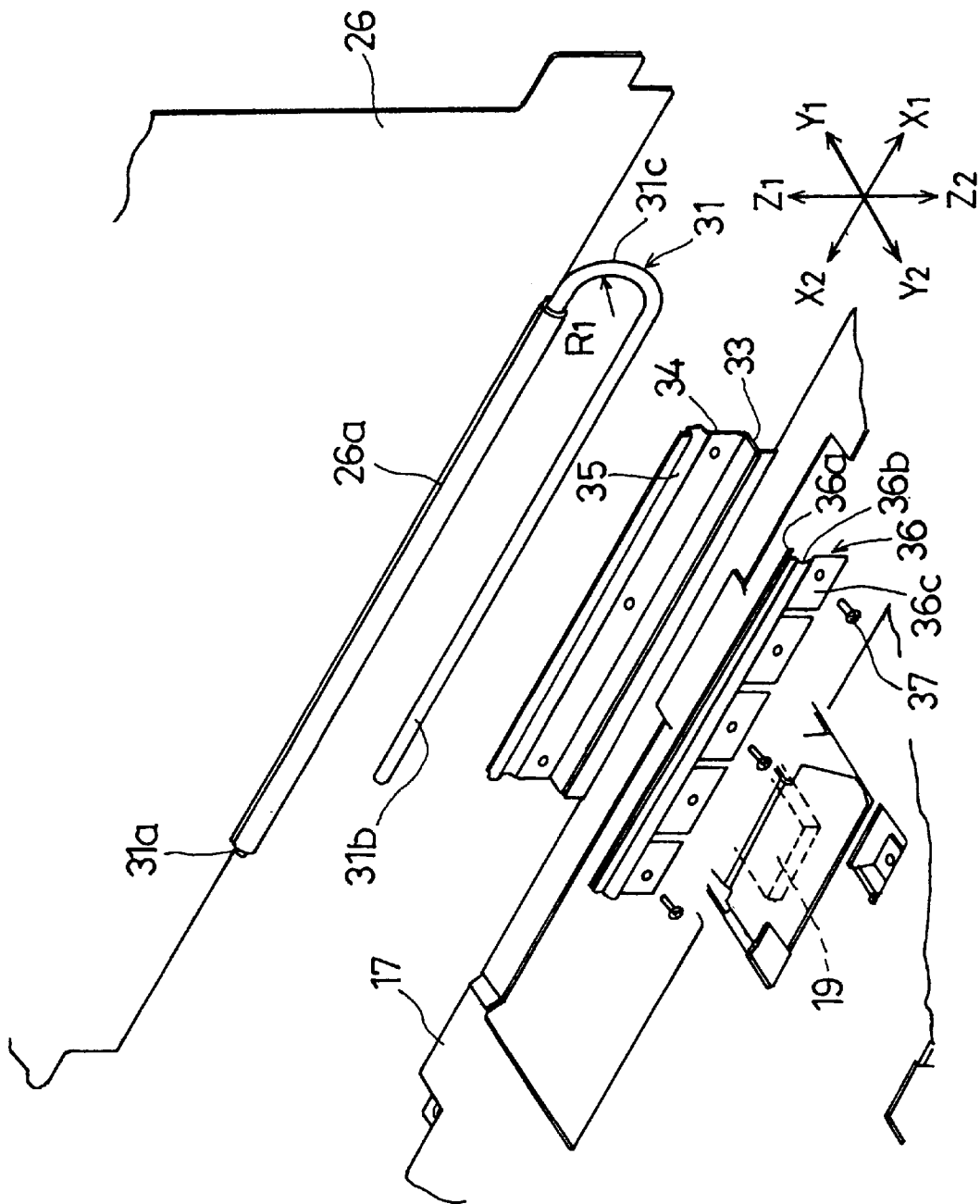
FIG. 3 is an enlarged, exploded view of the heat conducting apparatus of FIG. 1.

As depicted in FIG. 3, the U-shaped heat pipe 31 includes two parallel linear portions 31a and 31b joined by an arch portion 31c. For example, the heat pipe 31 has an outside diameter of 3 mm and a thickness as thin as 0.3 mm. The arch portion 31c has a long radius R1 of about 10 mm so that it can absorb a bending stress generated when the heat pipe 31 is bent. A linear portion 31a of the heat pipe 31 is fixedly disposed in a cylindrical portion 26a, which is formed by rounding the edge of the heat radiating plate 26. Another linear portion 31b remains external in a predetermined position with respect to the heat radiating plate 26.

The heat pipe supporting mechanism 32 includes, as shown in FIGS. 2 and 3, a steplike bent portion 33, which is formed on the edge of the base plate 17, an upright wall portion 34, a concave slot portion 35 and a holding member 36.

The steplike bent portion 33, which is bent to form a steplike figure, includes a vertical plate portion 33a and a lateral plate portion 33b. The upright wall portion 34 stands in a Z1 direction from the edge of the lateral plate portion 33b. The concave slot portion 35 has a cross section of a semicircular figure and is formed on the upright wall portion 34 to extend in an X1–X2 direction. As this base plate 17 is a thin aluminum plate, the steplike bent portion 33 is elastically deformed easily by small force in the same direction as widen or narrow an angle α formed between the vertical plate 33a and the lateral plate 33b, an angle β formed between the base plate 17 and the vertical plate 33a, and an angle θ formed between the lateral plate 33b and the upright wall portion 34.

The holding member 36 has a hook portion 36a formed on the top end, a concave slot portion 36b having a cross section of a semicircular figure, and a plate portion 36c divided into smaller plates. The holding member 36 has the hook portion 36a hooked over the top of the upright wall portion 34 with the plate portion 36c being coupled to the upright wall portion 34 by screws 37.

The aforementioned steplike bent portion 33 and the holding member 36 include a movement accommodating portion of the heat pipe supporting mechanism 32.

The concave slot portion 35 and the concave slot portion 36b are disposed so as to face each other, forming a cylindrical portion 38 extending in the X1–X2 direction. The linear portion 31b of the heat pipe 31, with its surface coated with grease 39, is inserted into this cylindrical portion 38. This cylindrical portion 38 includes a holding portion of the heat pipe supporting mechanism 32.

The heat pipe supporting mechanism 32 forms a thermal path, through which the heat generated from the CPU 19 is conducted to the heat radiating plate 26 by way of the block 20, the base plate 17, the steplike bent portion 33, the cylindrical portion 38, a layer of the grease 39 and the heat pipe 31, thus realizing the efficiency in the even diffusion and the radiation of heat.

The heat radiating plate 26 is incorporated into the liquid crystal display section 12 with its rounded bottom edge holding tightly the linear portion 31b of the heat pipe 31. This structure allows the linear portion 31b of the heat pipe 31 to appear from the bottom edge of the liquid crystal display section 12 as shown in FIG. 4. The linear portion 31b of the heat pipe 31 is supported by the heat supporting mechanism 32 first by connecting the liquid crystal display section 12 and the main unit 11 by means of the two hinge sections 13 and 14 disposed on each rear corner of the main unit 11, and then by coupling the holding member 36 to the upright wall portion 34 by the screws 37. The linear portion 31b of the heat pipe 31 fits in with the concave slot portion 35 formed on the upright wall portion 34 with the liquid crystal display section 12 being connected to the main unit 11 by means of the two hinge sections 13 and 14. The holding member 36 maybe attached so as to cover the linear portion 31b of the heat pipe 31. Supporting the linear portion 31b of the heat pipe 31 through the heat pipe supporting mechanism 32 is thus facilitated.

The heat pipe supporting mechanism 32 is disposed between the two hinge sections 13 and 14 arranged on each rear corner of the main unit 11 and is covered with a cover 41 having a semi-cylindrical shape. The cover 41 forms a part of the main unit 11.

Herein will be described the flexibility of the cylindrical portion 38 by referring to FIGS. 5, 6 and 7.

CL2 indicates the center line of the cylindrical portion 38 and O2 indicates the center of the cylindrical portion 38.

Figure 6:
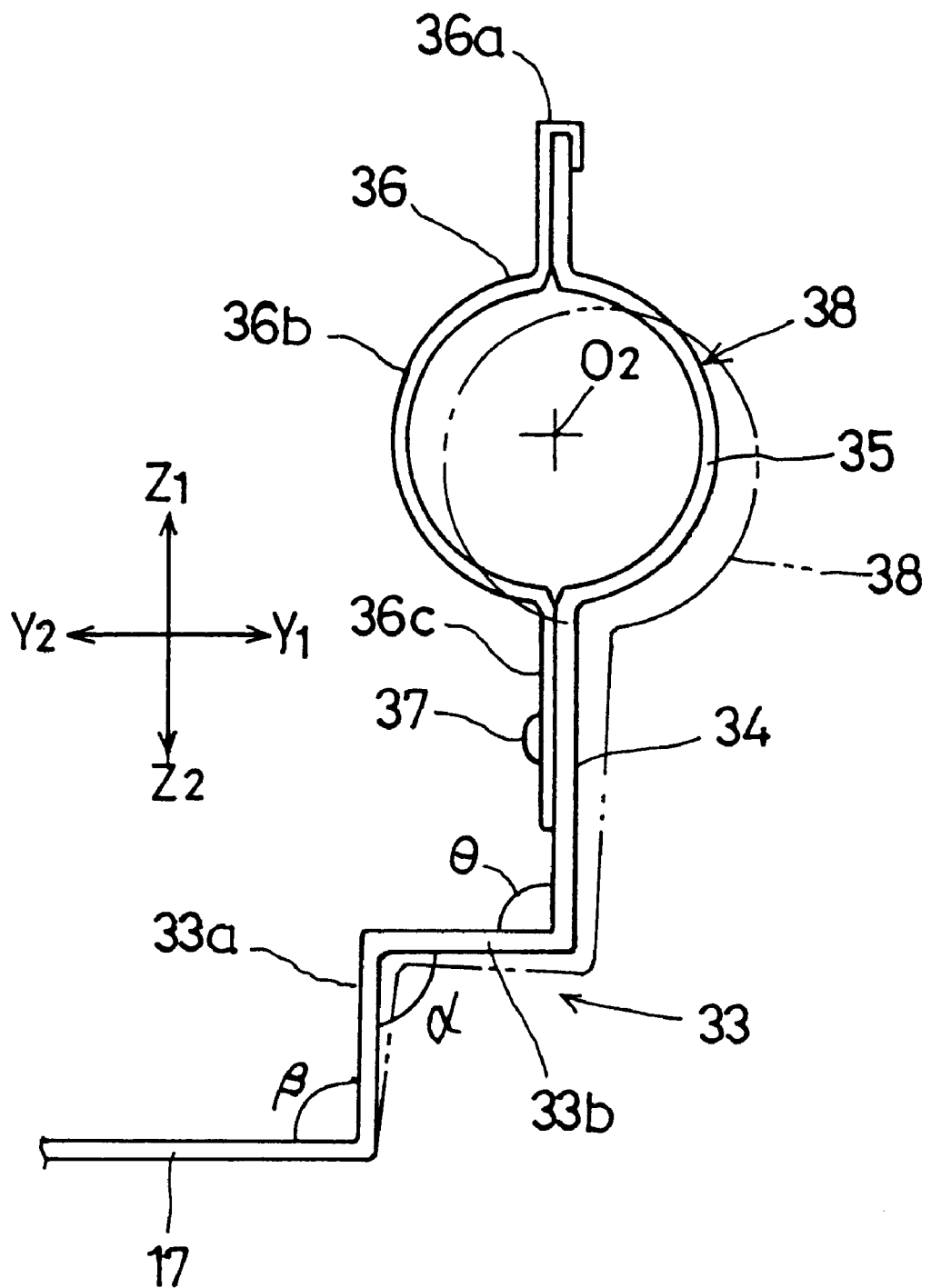
FIG. 6 illustrates the flexibility of a cylindrical portion.

For example, as depicted by dotted lines in FIG. 6, the center of the cylindrical portion 38 is movable in a Y1–Y2 and a Z1–Z2 directions according as the steplike bent portion 33 is deformed in the same direction as widen or narrow the angles α, β, and θ.

Figure 7:
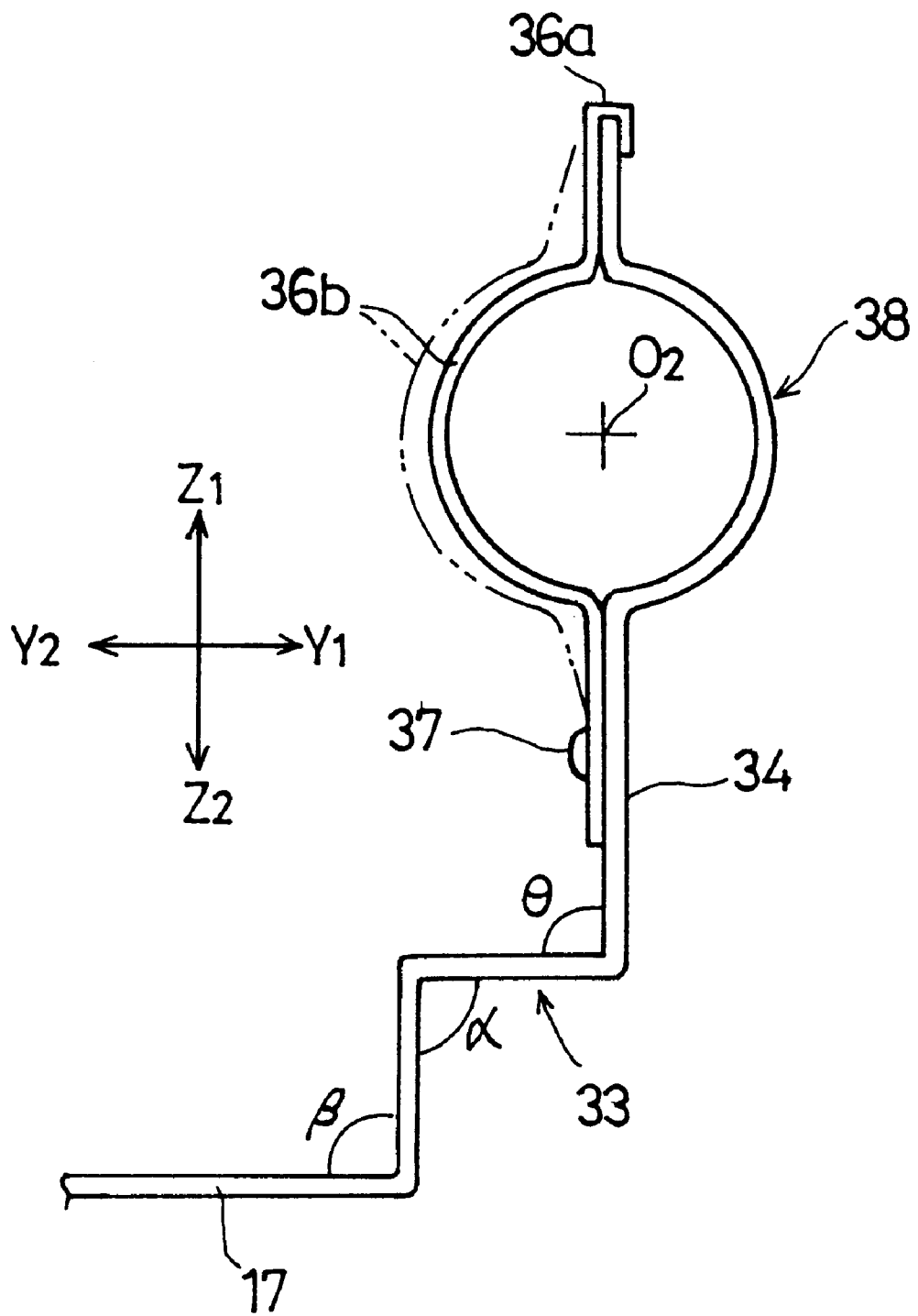
FIG. 7 illustrates the flexibility of the cylindrical portion.

Further, the cylindrical portion 38, which includes the upright wall portion 34 and the holding member 36, can bulge toward a Y2 direction, for the holding member 36 deforms in the opposite direction from the upright wall 34 as depicted by dotted lines in FIG. 7 since the holding member 36 is fixed to the upright wall portion 34 by the screws 37, which are not disposed very close to, but are disposed at a distance in a Z1–Z2 direction from the cylindrical portion 38.

Herein will be described a movement of the linear portion 31b of the heat pipe 31 when the liquid crystal display section 12 is rotated to be opened or closed with respect to the main unit 11.

(1) In case the center O1 of the hinge sections 13 and 14 moves in a Y1–Y2 and a Z1–Z2 directions.

Figure 8:
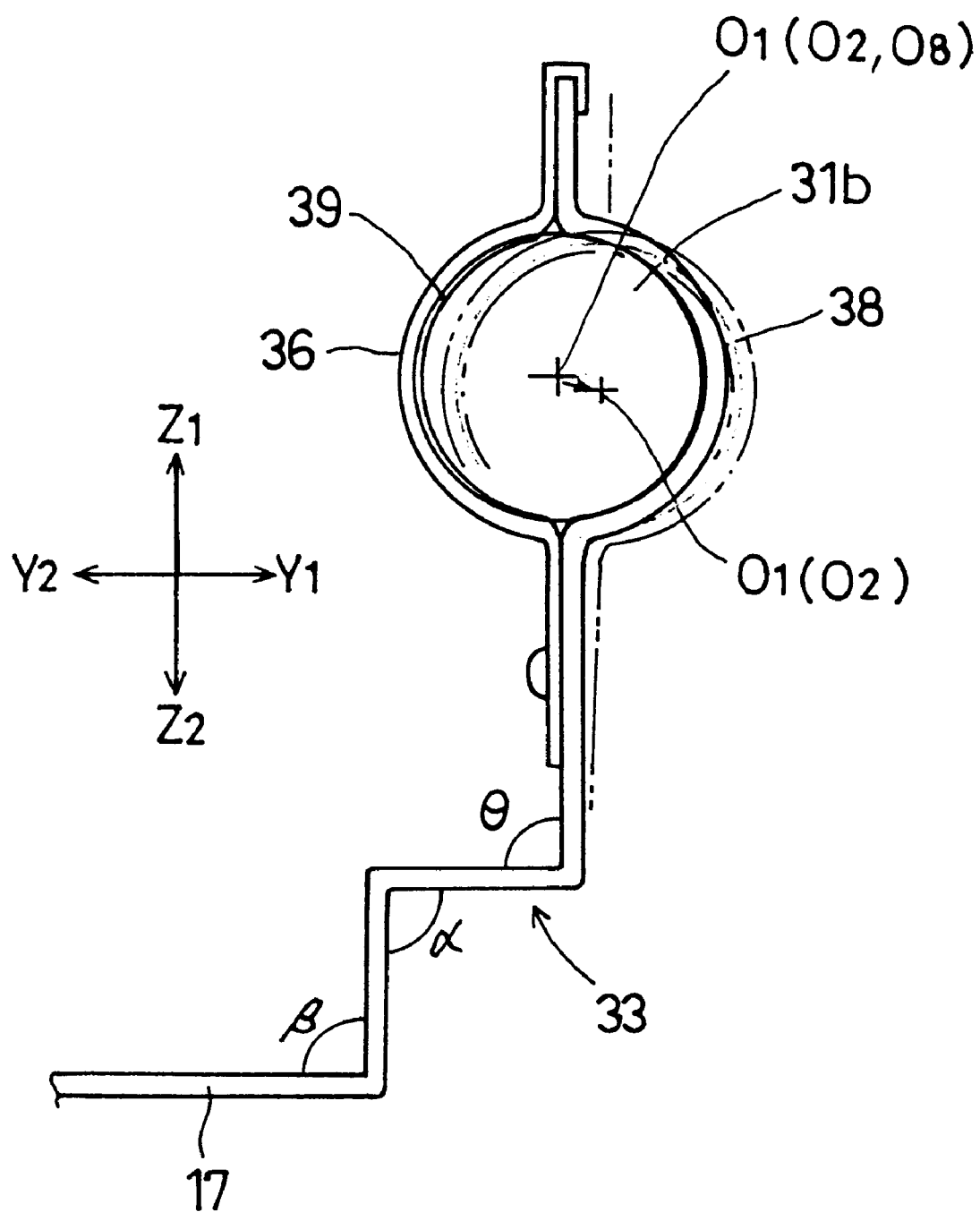
FIG. 8 illustrates a movement of the cylindrical portion when the center of the hinge sections moves during the folding action of a liquid crystal display section.

The liquid crystal display section 12 and the heat pipe 31 move in conformity with the hinge sections 13 and 14, and the movement of the linear portion 31b of the heat pipe 31 is transmitted to the cylindrical portion 38. Then, as depicted by dotted lines in FIG. 8, the steplike bent portion 33 and the holding member 36 are deformed, allowing the cylindrical portion 38 to move in accordance with the movement of the center of the hinge sections 13 and 14.

Therefore, the linear portion 31b of the heat pipe 31 rotates within the cylindrical portion 38 with its center O3, together with the cylindrical portion 38, moving in accordance with the movement of the center O1 of the hinge sections 13 and 14. As the surface of the linear portion 31b of the heat pipe 31 is coated with the grease 39, the linear portion 31b rotates smoothly within the cylindrical portion 38 without wear.

Therefore, as the linear portion 31b of the heat pipe 31 is so supported by the heat pipe supporting mechanism 32 as to move without restraints, the heat pipe 31 itself is not subject to a bending pressure, generating no bending stress from within, which prevents the heat pipe 31 from being damaged or broken.

(2) In case the center O3 of the linear portion 31b of the heat pipe 31, or the center O2 of the cylindrical portion 38, moves by δ with respect to the center O1 of the hinge sections 13 and 14.

Figure 9:
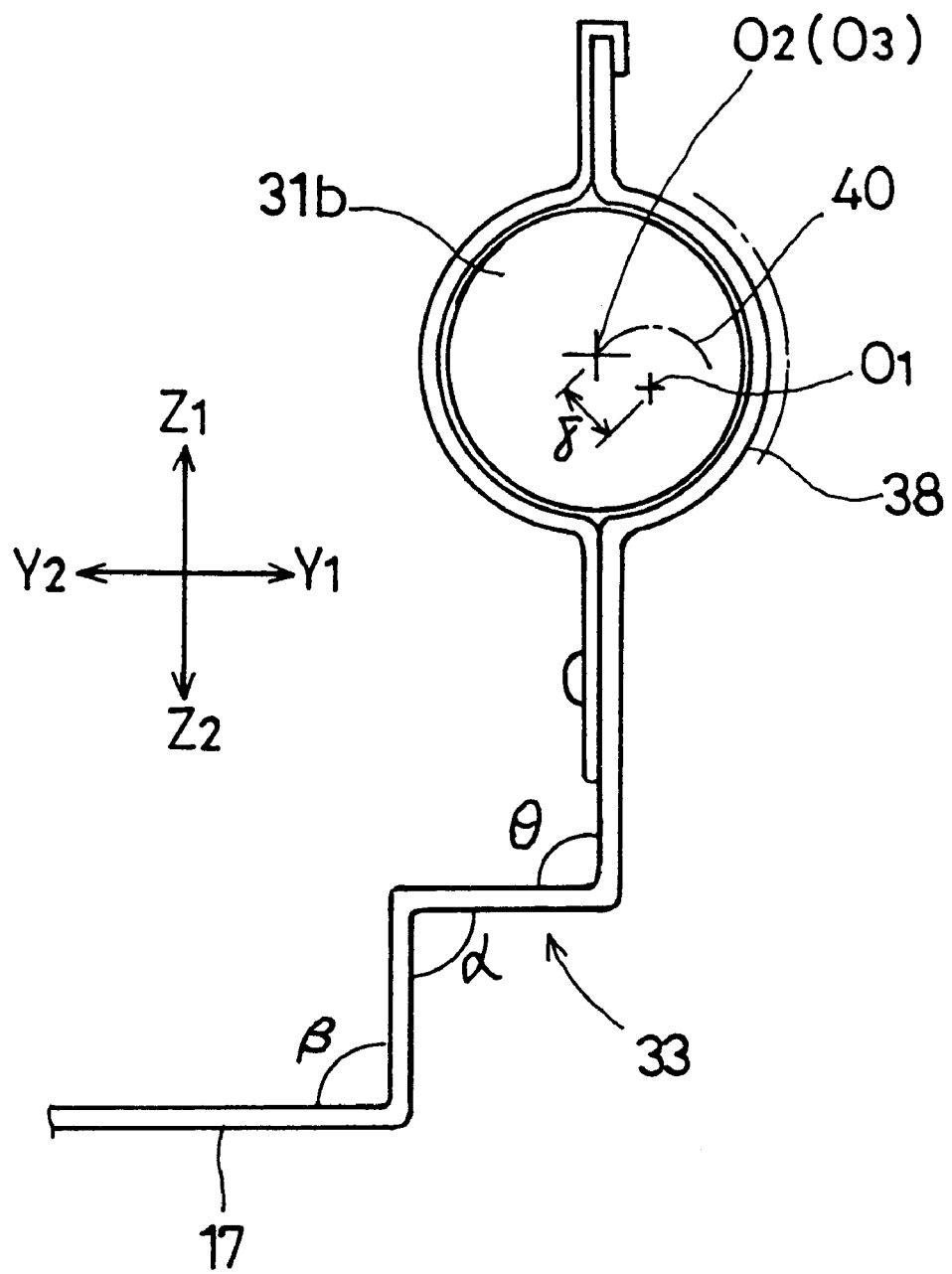
FIG. 9 illustrates a movement of the cylindrical portion during the folding action of the liquid crystal display section when the center of the cylindrical portion does not correspond to the center of the hinge sections.

According to the design of the heat pipe supporting mechanism 32, the center O3 of the linear portion 31b of the heat pipe 31, or the center O2 of the cylindrical portion 38, should correspond to the center O1 of the hinge sections 13 and 14. Practically, however, an error in the assembly of the hinge mechanism 32, a change in the hinge mechanism 32 with the passage of time since the beginning of its use, and so on sometimes cause the center O3 of the linear portion 31b of the heat pipe 31, or the center O2 of the cylindrical portion 38, to move by δ, as shown in FIG. 9, with respect to the center O1 of the hinge sections 13 and 14.

When the liquid crystal display is rotated, the center of the linear portion 31b of the heat pipe 31 starts to move along an arc 40 having a radius of δ of the center O1 of the hinge sections 13 and 14. Then, the steplike bent portion 33 and the holding member 36 are deformed so as to allow the cylindrical portion 38 to move in accordance with the movement of the linear portion 31b of the heat pipe 31, namely, to move along the arc 40.

Therefore, the linear portion 31b of the heat pipe 31 rotates within the cylindrical portion 38, moving, together with the cylindrical portion 38, along the arc 40. As the surface of the linear portion 31b of the heat pipe 31 is coated with the grease 39, the linear portion 31b rotates smoothly within the cylindrical portion 38 without wear.

Therefore, as the linear portion 31b of the heat pipe 31 is so supported by the heat pipe supporting mechanism 32 as to move without restraints, the heat pipe 31 itself is not subject to a bending pressure, generating no bending stress from within, which prevents the heat pipe 31 from being damaged or broken.

The amount of force required to deform the steplike bent portion 33 and the holding member 36 increases as the amount of deformation increases. Therefore, it sometimes happens that the heat pipe 31 is bent to some degree depending on the extent of the movement of the linear portion 31b of the heat pipe 31. However, the heat pipe 31 is prevented from being broken during the repetitive folding actions of the liquid crystal display section 12 since the arch portion 31c has the long radius R1 of about 10 mm such that a bending stress will not concentrate on a bend point of the heat pipe 31.

Herein will be described other embodiments of the present invention.

Figure 10:
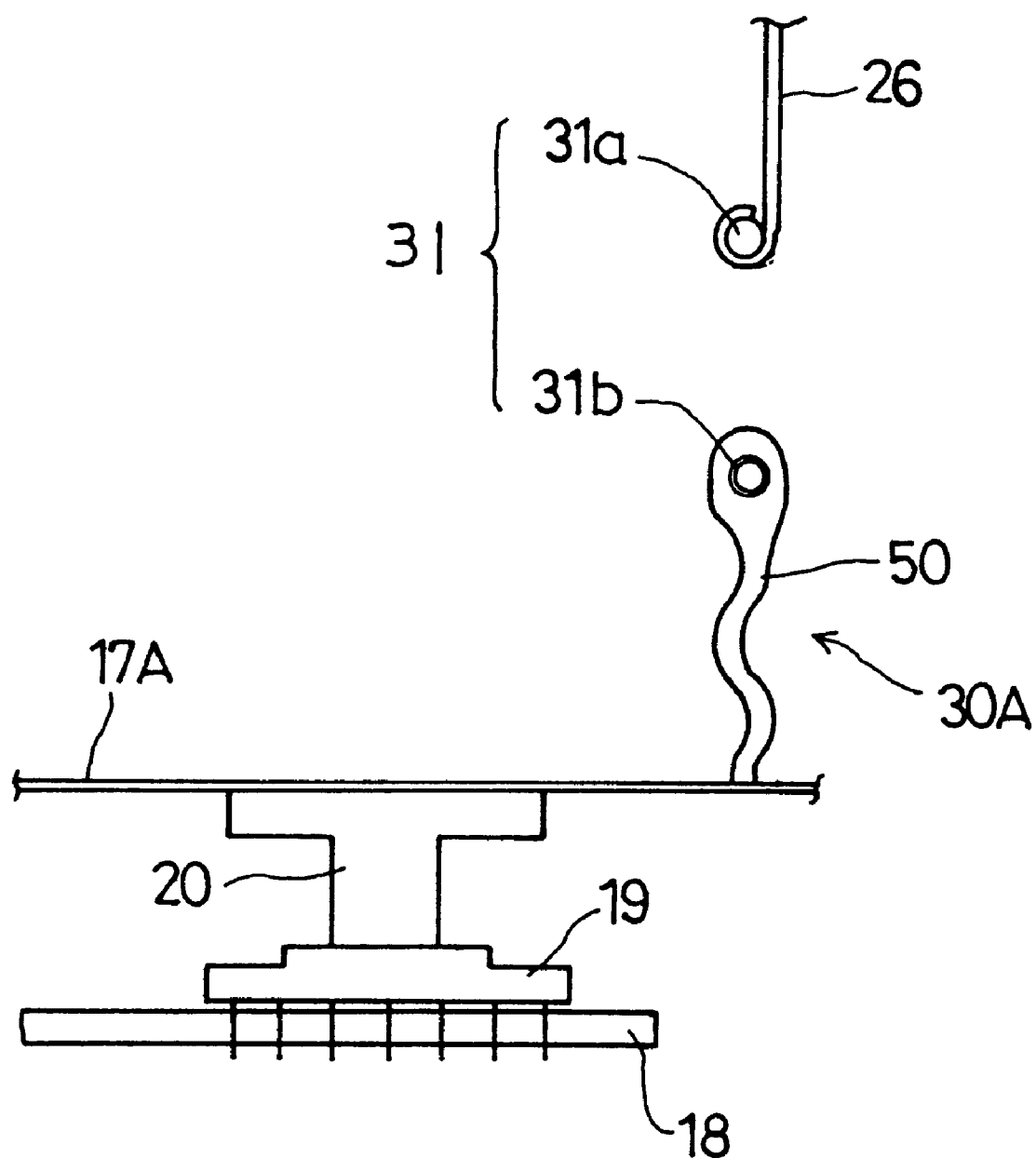
FIG. 10 illustrates a heat conducting apparatus according to a second embodiment of the present invention.

FIG. 10 depicts a heat conducting apparatus 30A according to a second embodiment of the present invention. A rubber member 50 of a good thermal conductivity is attached to a base plate 17A. The linear portion 31b of the heat pipe 31 is attached to the rubber member 50.

Figure 11:
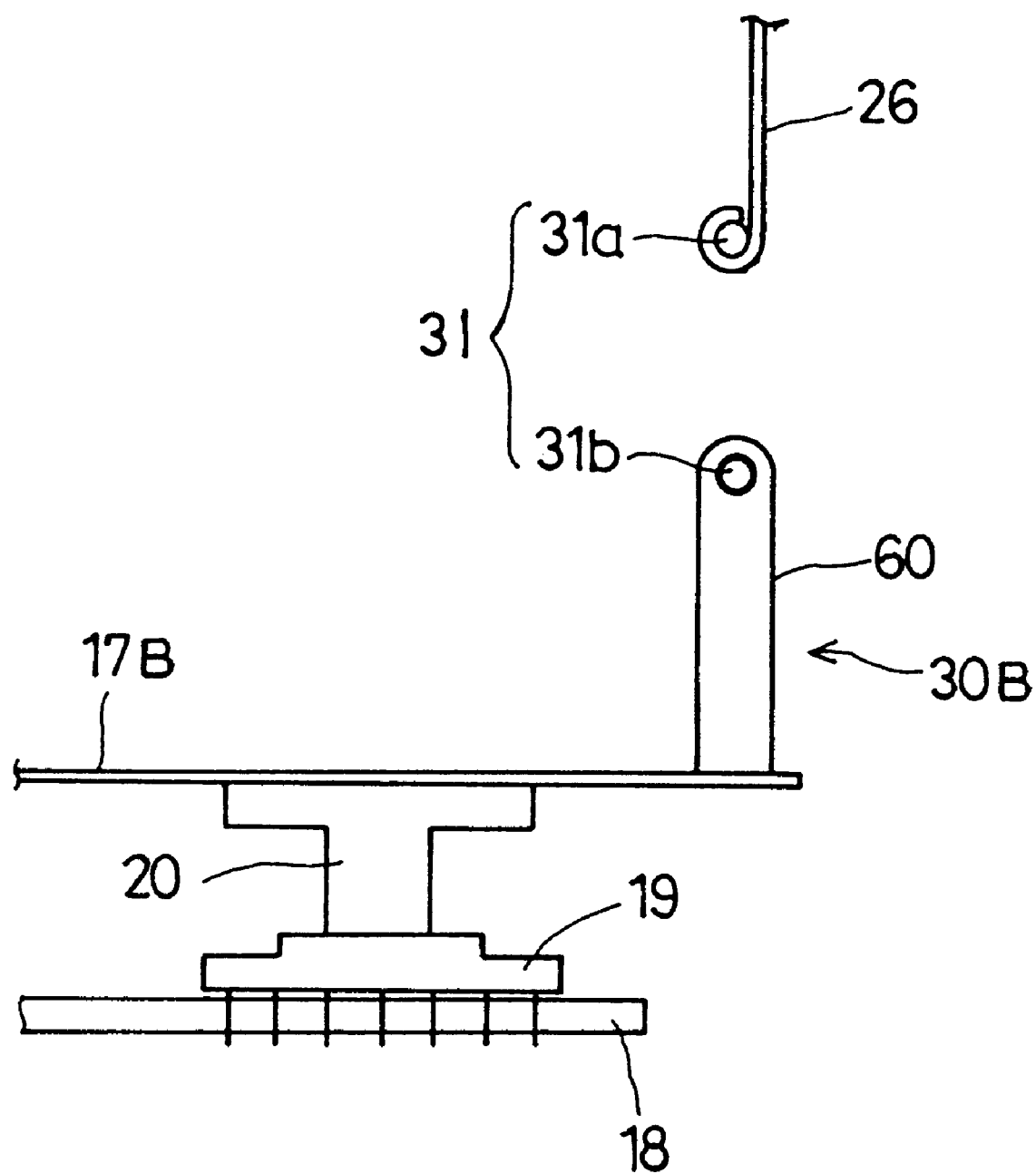
FIG. 11 illustrates a heat conducting apparatus according to a third embodiment of the present invention.

FIG. 11 depicts a heat conducting apparatus 30B according to a third embodiment of the present invention. Attached to a base plate 17B is a flexible member 60 of a good thermal conductivity, which deforms without restorability. The linear portion 31b of the heat pipe 31 is attached to the flexible member 60.

Figure 12:
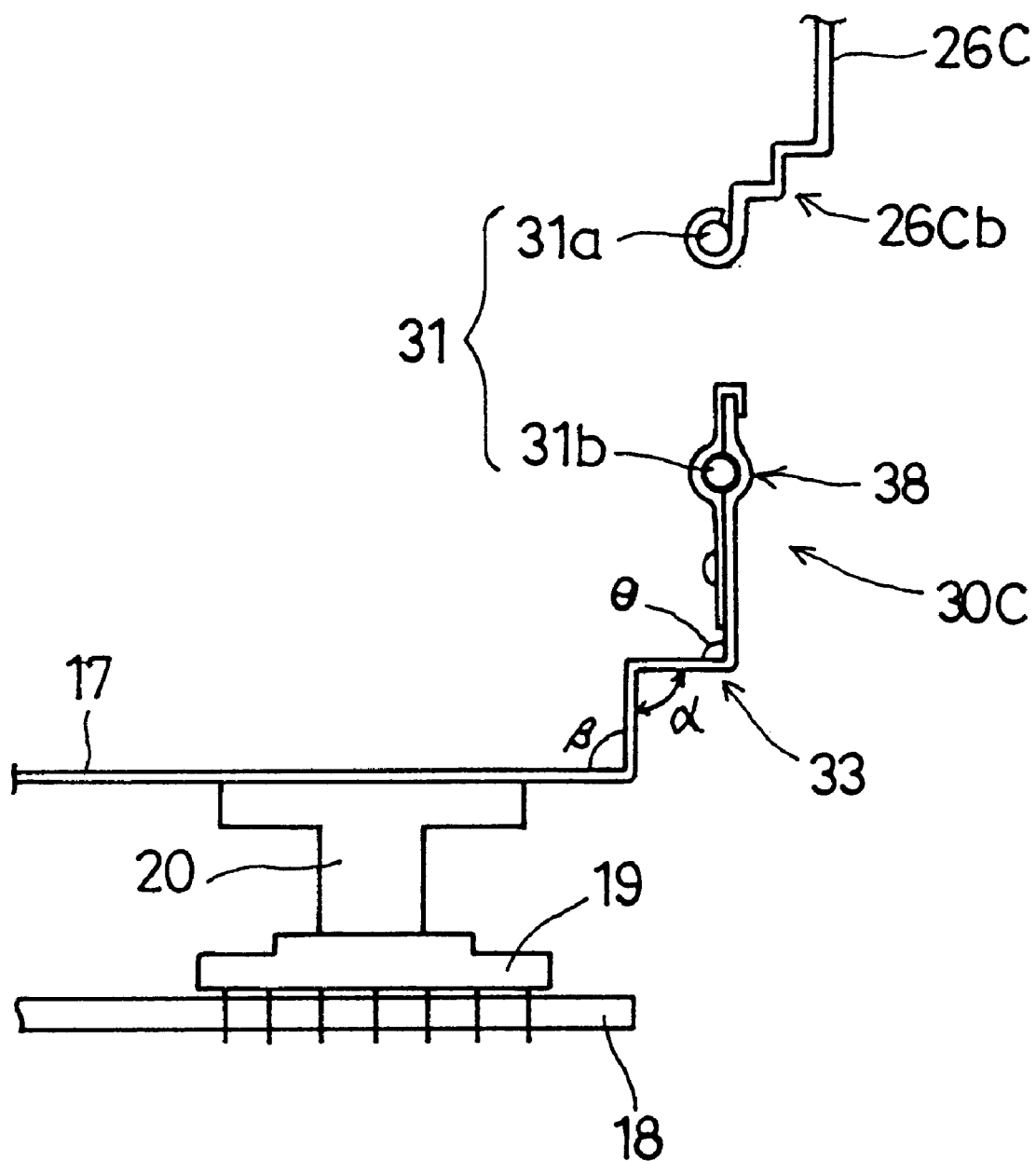
FIG. 12 illustrates a heat conducting apparatus according to a fourth embodiment of the present invention.

FIG. 12 depicts a heat conducting apparatus 30C according to a fourth embodiment of the present invention. A steplike figure portion 26Cb is formed on the edge of a heat radiating plate 26C, and the linear portion 31a of the heat pipe 31 is fixedly disposed in a cylindrical portion formed on the edge of the steplike figure portion 26Cb. The elastic deformation of the steplike figure portion 26Cb allows the linear portion 31a of the heat pipe 31 to move to some extent. By means of this structure, the movement of the linear portion 31b of the heat pipe 31 during the folding action of the liquid crystal display section 12 is absorbed by the deformation of the steplike bent portion 33 and the steplike figure portion 26Cb. Therefore, the movement of the linear portion 31b of the heat pipe 31 can be absorbed to a greater extent, thus preventing the arch portion 31c of the heat pipe 31 from being bent even if the linear portion 31b of the heat pipe 31 moves considerably during the folding action of the liquid crystal display section 12.

Figure 13:
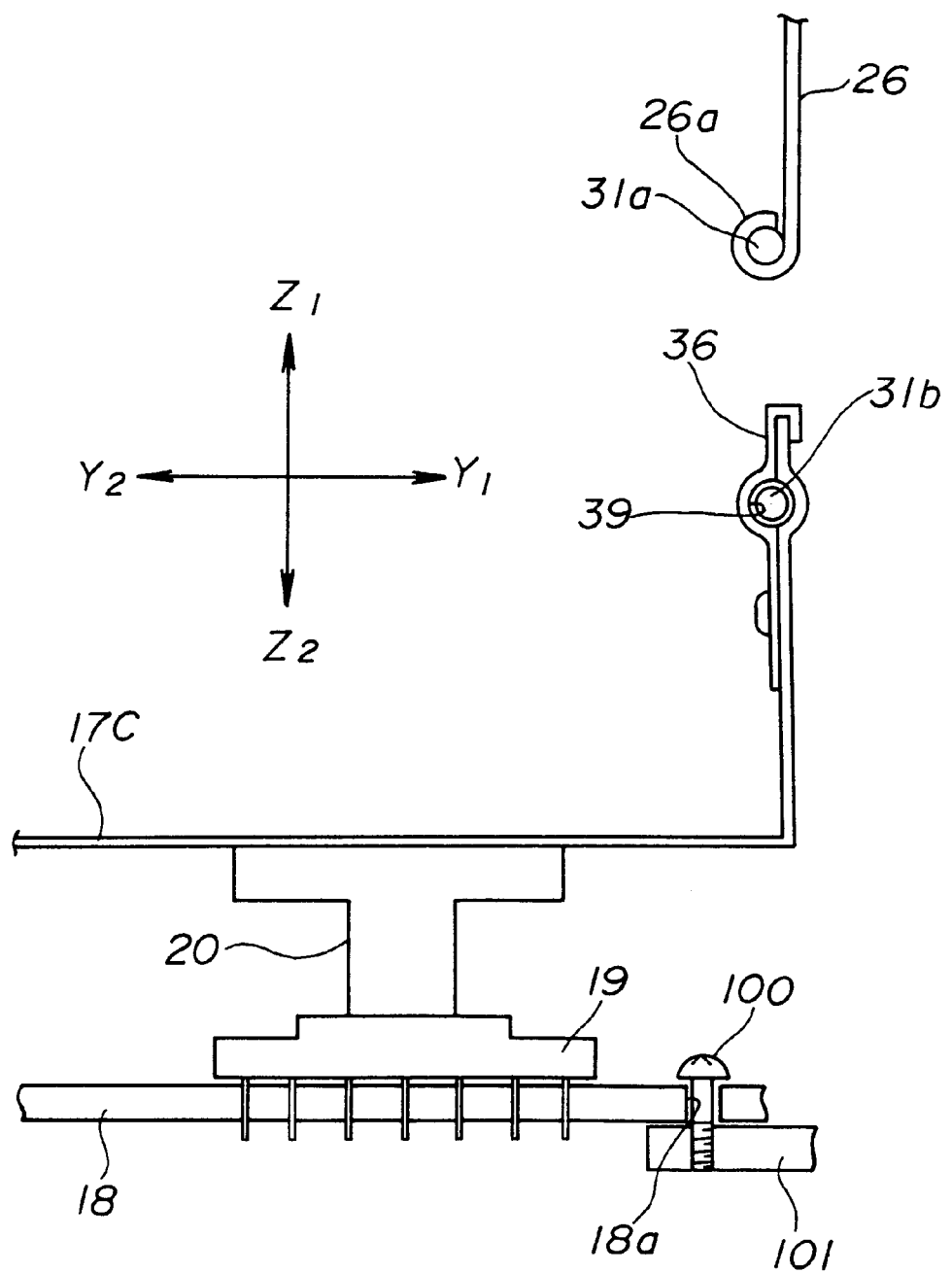
FIG. 13 illustrates a heat conducting apparatus according to a fifth embodiment of the present invention.

FIG. 13 depicts a heat conducting apparatus 30D according to a fifth embodiment of the present invention. The printed circuit board 18 is fixed to a chassis 101 by a screw 100. The screw 100 fits loosely in an aperture 18a in the printed circuit board 18, permitting the printed circuit board 18 to freely move within a small area with respect to the chassis 101. Therefore, a base plate 17C, together with the CPU 19, the block 20, and the printed circuit board 18, is allowed to freely move within a small area when external force is exerted on the base plate 17C. The linear portion 31b of the heat pipe 31 is rotatably supported on the edge of the base plate 17C.

During the folding action of the liquid crystal display section 12, the base plate 17C moves in accordance with the movement of the linear portion 31b of the heat pipe 31. Therefore, no bending stress is generated within the heat pipe 31.

The present invention is not limited to the specifically disclosed embodiments, and variations and modifications may be made without departing from scope of the present invention.

The present application is based on Japanese priority application no. 11-122372 filed on Apr. 28, 1999, the entire contents of which are hereby incorporated by reference.

What is claimed is:

1. A heat conducting apparatus comprising:
   a single continuous heat pipe which conducts heat between a first member and a second member connected by hinge sections, said heat pipe having a first end portion attached to one of said first and second members, and a second end portion extending substantially along a center line of said hinge sections; and
   a heat pipe supporting mechanism which is disposed on a member different from said one of the first and second members and supports the second end portion so that the second end portion can freely move within a given range,
   the heat pipe supporting mechanism forming a thermal path between the first and second members together with the heat pipe.

2. The heat conducting apparatus as claimed in claim 1, wherein said heat pipe supporting mechanism comprises:
   a holding portion which extends along the center line of said hinge sections, said holding portion holding the second end portion of said heat pipe so that the second end portion can rotate; and
   a movement accommodating portion which supports said holding portion so as to accommodate a movement of said holding portion.

3. The heat radiating apparatus as claimed in claim 1, wherein said heat pipe supporting mechanism comprises:
   a cylindrical portion which extends along the center line of said hinge sections, said cylindrical portion holding rotatably the second end portion of said heat pipe; and
   a movement accommodating portion which supports said cylindrical portion so as to accommodate a movement of said cylindrical portion.

4. The heat conducting apparatus as claimed in claim 2, wherein said movement accommodating portion is elastically deformed.

5. The heat conducting apparatus as claimed in claim 1, wherein the first end portion of said heat pipe is supported so as to move freely within a given range.

6. An electronic apparatus having a first housing and a second housing connected by hinge sections, said electronic apparatus comprising:
   a single continuous heat pipe which has a first end portion disposed on one of said first and second housings, and a second end portion extending along a center line of said hinge sections; and
   a heat pipe supporting mechanism which is disposed on a housing different from one of the first and second housings and supports the second end portion so that the second end portion can freely move within a given range,
   the heat pipe supporting mechanism forming a thermal path between the first and second housings together with the heat pipe.

7. The electronic apparatus as claimed in claim 6, wherein said heat pipe supporting mechanism comprises:
   a holding portion which extends along the center line of said hinge sections, said holding portion holding the second end portion of said heat pipe so that the second end portion can rotate; and
   a movement accommodating portion which supports said holding portion so as to accommodate a movement of said holding portion.

8. The electronic apparatus as claimed in claim 6, wherein said first housing includes a display section and the second housing includes a heat source.

9. The electronic apparatus as claimed in claim 7, wherein said first housing includes a display section and the second housing includes a heat source.

10. A heat conducting apparatus comprising:
    a heat pipe which conducts heat between a first member and a second member which are engaged via at least one hinge section, said heat pipe having a substantially U-shape with a first end portion engaged to the first member and a second end portion extending substantially parallel to a rotary axis of the hinge section; and
    a heat pipe supporting mechanism which is disposed on the second member and supports the second end portion of the heat pipe so that the second end portion is rotatable within a predetermined range,
    said heat pipe supporting mechanism forming a thermal path between the first and second members together with the heat pipe.

11. The heat conducting apparatus as claimed in claim 10, wherein s aid first and second members are engaged via two hinge sections, and the second end portion of the heat pipe is disposed between the two hinge sections.

12. The heat conducting apparatus as claimed in claim 11, wherein said heat pipe is made of a single continuous pipe having the first and second end portions.

13. An electronic apparatus having a first housing and a second housing which are engaged via at least one hinge section, said electronic apparatus comprising:

a heat pipe which has a first end portion disposed on the first housing and a second end portion extending substantially parallel to a rotary axis of the hinge section; and a heat pipe supporting mechanism which is disposed on the second housing and supports the second end portion of the heat pipe so that the second end portion is rotatable within a predetermined range, said heat pipe supporting mechanism forming a thermal path between the first and second housings together with the heat pipe.

14. The electronic apparatus as claimed in claim 13, wherein said first and second housings are engaged via two hinge sections, and the second end portion of the heat pipe is disposed between the two hinge sections.

15. The electronic apparatus as claimed in claim 14, wherein said heat pipe is made of a single continuous pipe having the first and second end portions.

* * * * *